United States Patent [19]

Bowmer

[11] 4,057,882
[45] Nov. 15, 1977

[54] APPARATUS FOR COMPRESSING SLEEVES ONTO STRUCTURAL RODS

[75] Inventor: Geoffrey Malcolm Bowmer, Sandton, Transvaal, South Africa

[73] Assignee: Zeitgeist AG., Zug, Switzerland

[21] Appl. No.: 676,349

[22] Filed: Apr. 12, 1976

Related U.S. Application Data

[63] Continuation-in-part of Ser. No. 487,029, July 10, 1974, abandoned.

[30] Foreign Application Priority Data

Aug. 6, 1973 South Africa ............... 73/5327
Mar. 25, 1974 South Africa ............... 74/1914

[51] Int. Cl.² ............................................. B23P 11/00
[52] U.S. Cl. ............................... 29/283.5; 29/237; 29/518; 29/519; 72/253 R
[58] Field of Search ............ 29/200 B, 282, 237, 29/519, 252, 517, 518, 283.5; 72/253

[56] References Cited

U.S. PATENT DOCUMENTS

| | | | |
|---|---|---|---|
| 1,761,521 | 6/1930 | Eastman | 29/418 UX |
| 2,406,392 | 8/1946 | Minarik | 29/282 |
| 2,696,130 | 12/1954 | Peters | 29/282 X |
| 3,019,520 | 2/1962 | Woolley | 29/520 X |
| 3,201,859 | 8/1965 | Stanley | 29/282 |
| 3,559,270 | 2/1971 | Beghi | 29/282 |
| 3,614,885 | 10/1971 | Eppler | 29/519 X |
| 3,777,354 | 12/1973 | Masters | 29/520 X |

Primary Examiner—Charlie T. Moon
Attorney, Agent, or Firm—Colton & Stone, Inc.

[57] ABSTRACT

Apparatus for fastening to adjacent substantially co-axially disposed reinforcing rod ends a sleeve of uniform external cross-section throughout its length and having internal cross-sectional dimensions to enable it to receive and embrace both rod ends, comprising at least two fluid pressure operated jack units each having a cylinder, a piston and a piston rod; latching means for releasably securing the jack cylinders together in parallel spaced relationship to one another around one of the reinforcing rods in a zone not occupied by the sleeve; at least two die segments, which collectively provide an axial bore at least part of which is dimensionally smaller in cross-section than the external cross-sectional dimension of the sleeve, loosely mounted on the free ends of the piston rods so as to be capable of limited rotational movement relative thereto in a longitudinal direction; die segment retaining means at the extremities of the piston rods; ring-shaped locking members for temporarily securing the die segments in operative relationship one to the other and which permit the aforesaid limited rotational movement thereof; and complementary formations on the die segments for receiving the ring-shaped locking members.

7 Claims, 9 Drawing Figures

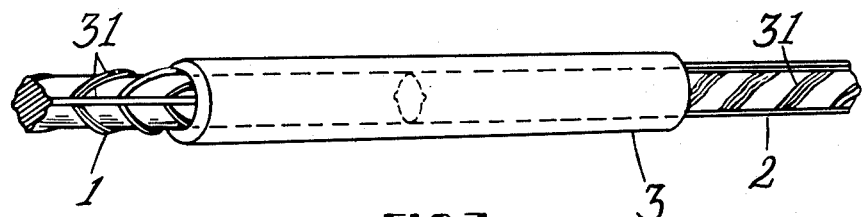
FIG.7
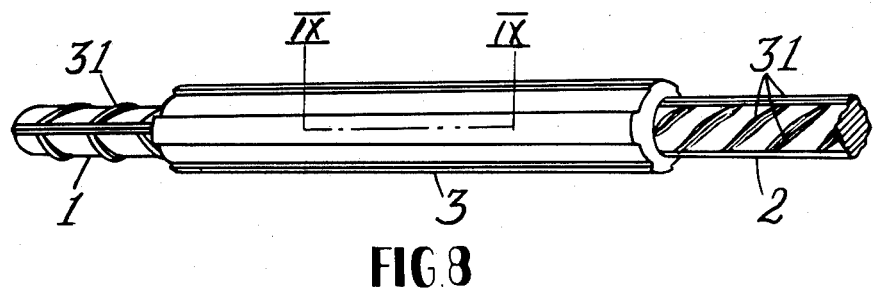
FIG.8
FIG.9
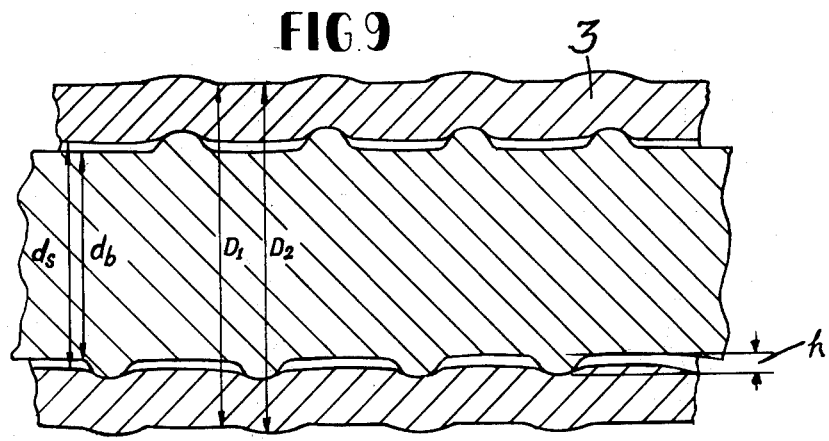

APPARATUS FOR COMPRESSING SLEEVES ONTO STRUCTURAL RODS

This invention relates to apparatus for connecting steel reinforcing rods, such as are used for structural purposes, in end to end relationship and the present application is a continuation-in-part of application Ser. No. 487 029 filed on July 10, 1974 now abandoned.

When structural steel reinforcing rods are positioned prior to casting concrete around them, it is a common practice to overlap the adjacent ends of rods which are disposed so that their longitudinal axes are substantially co-planar. The object is, of course, to minimise the risk of a weakness in the junction zone. This practice is, however, wasteful of steel.

To obviate this disadvantage, it has been proposed to accommodate adjacent rod ends in a steel sleeve and to crimp the sleeve onto the rods in a number of different parallel transverse zones by means of a hydraulic press. The chief disadvantage of this proposal lies in the fact that the necessary hydraulic equipment is usually bulky with the result that in many cases it cannot be manoevred into the required position because other reinforcing rods block access. It will be understood that the equipment must be positioned transversely with respect to the longitudinal axes of the rods.

It has also been proposed to effect a joint by compressing a steel sleeve onto adjacent rod ends by means of an explosive charge. This proposal suffers from the disadvantage that it is noisy and is liable to damage or displace adjacent formwork and concrete.

If welding is resorted to, the operation is relatively slow and it requires a skilled welder to produce a good joint. Furthermore, he must necessarily use bulky equipment.

One object of the present invention is to provide new or improved apparatus for fastening a steel connecting sleeve to adjacent rod ends which overcomes or minimises the disadvantages hitherto inherent in the use of such sleeves.

The type of rod with which the invention is concerned is that which is either formed with surface deformations or which has such deformations introduced as, for example, by interposing a steel wire helix between the rods and the sleeve.

Another object of the invention is to provide portable apparatus for the purpose stated which can be used in relatively confined spaces.

A further object of the invention is to provide apparatus which will be capable of fastening the sleeve to rods which may differ in cross-section within the range of permissible tolerance which may be as much as 12 per cent in some cases.

A still further object of the invention is to provide apparatus which will effect a satisfactory joint with relatively low power requirements.

Other objects, features and advantages of the invention will be apparent from the specification, the drawings and the claims.

In the drawings, wherein like reference numerals indicate like parts, and wherein an illustrative embodiment of the invention is shown:

FIG. 7 is a perspective view showing a sleeve assembled to two adjacent rod ends before deformation of the sleeve.

FIG. 8 is a perspective view showing a sleeve assembled to two adjacent rod ends after deformation of the sleeve.

FIG. 9 is a longitudinal section on the line IX—IX in FIG. 8 on an enlarged scale.

Figure 1:
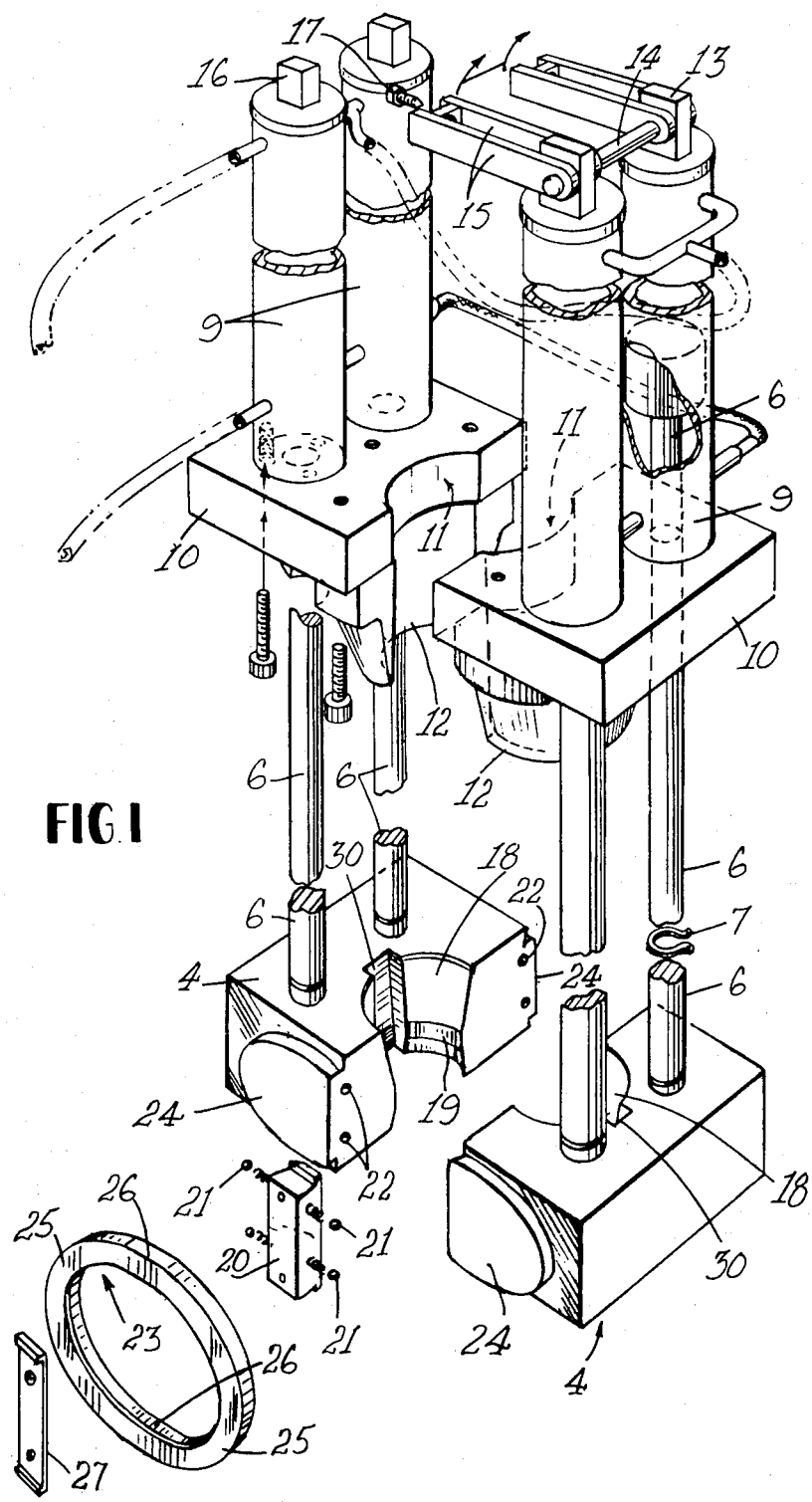
FIG. 1 is an exploded perspective view of apparatus for fastening a sleeve onto adjacent rod ends constructed in accordance with the invention.
Figure 2:
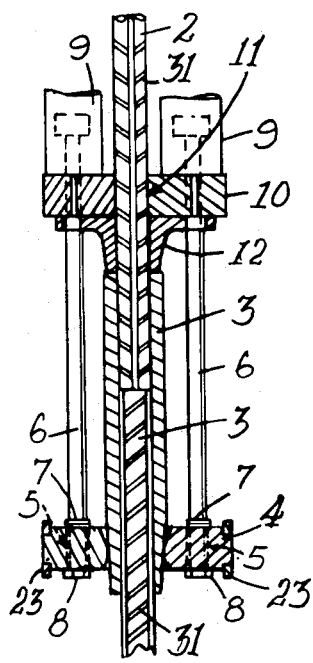
FIG. 2 is a part sectional elevation on a reduced scale of the apparatus of FIG. 1 assembled to the rod ends.

Referring to the drawings, the apparatus is constructed in two separate halves which may be secured together around ribbed rods 1 and 2 and their embracing cylindrical sleeve 3.

Each half includes a die segment 4 having holes 5 to permit of its being mounted on the free ends of piston rods 6 of hydraulic jacks. It is emphasised that the die segment is not a tight fit on the piston rods and that it is capable of a limited rotational movement relative thereto in a longitudinal direction. The piston rods 6 carry circlips 7 on one side of the die segment 4 and retaining nuts 8 on the other. The jack cylinders 9 are secured to a mounting plate 10 disposed in parallel spaced relationship to the die segment 4 and through which the piston rods 6 pass. The plate 10 is formed with a recess 11 which partially embraces the peripheral surface of the rod 2.

The mounting plates 10 are provided with spigot elements 12 which are adapted to bear against one end of the sleeve 3 and prevent it from moving longitudinally with respect to the rod ends. Furthermore, the spigot elements are tapered in a direction towards the die so as to permit them to pass into the bore of the die and so enable the sleeve to be deformed throughout its length.

One pair of jack cylinders 9 is provided with bored lugs 13 through which a hinge pin 14 passes. The pin 14 carries strap members 15 which are adapted to be swung over lugs 16 carried by the other pair of jack cylinders and locked by means of bolts 17. By this means the two halves of the apparatus are removably connected together at the end remote from the die segments 4. The positioning of the connecting means described above at the cylinder ends remote from the die segments enables the out of balance forces which will be encountered to be resisted.

The die segments 4 collectively provide a bore 18 at least part of which is dimensionally smaller than the external dimension of the sleeve 3. This part is denoted by the numeral 19.

Figure 3:
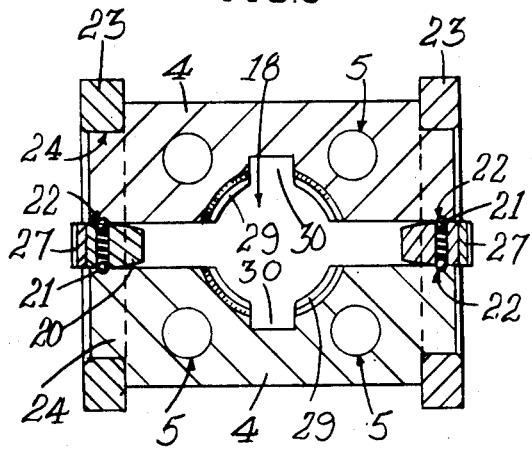
FIG. 3 is a sectional elevation of the die segments on an enlarged scale.
Figure 4:
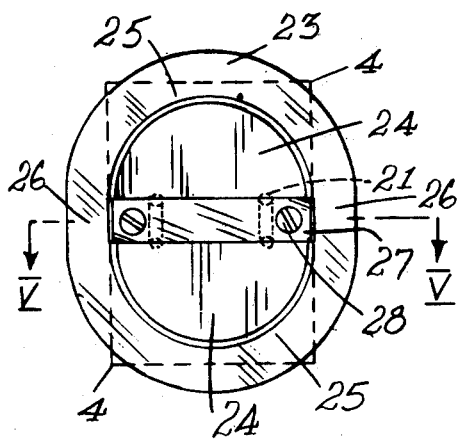
FIG. 4 is an end elevation, also on an enlarged scale, of the die segments of FIG. 3 showing the means by which they are connected together.
Figure 5:
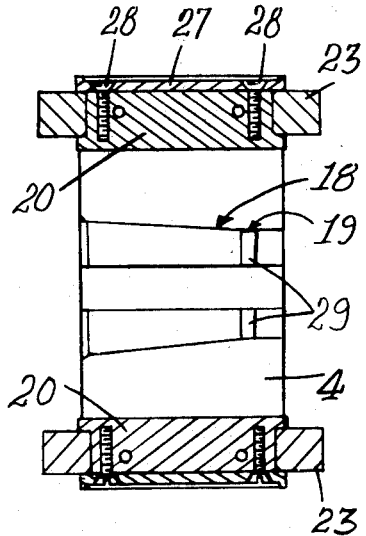
FIG. 5 is a cross-section, also on an enlarged scale, on the line V–V in FIG. 4.
Figure 6:
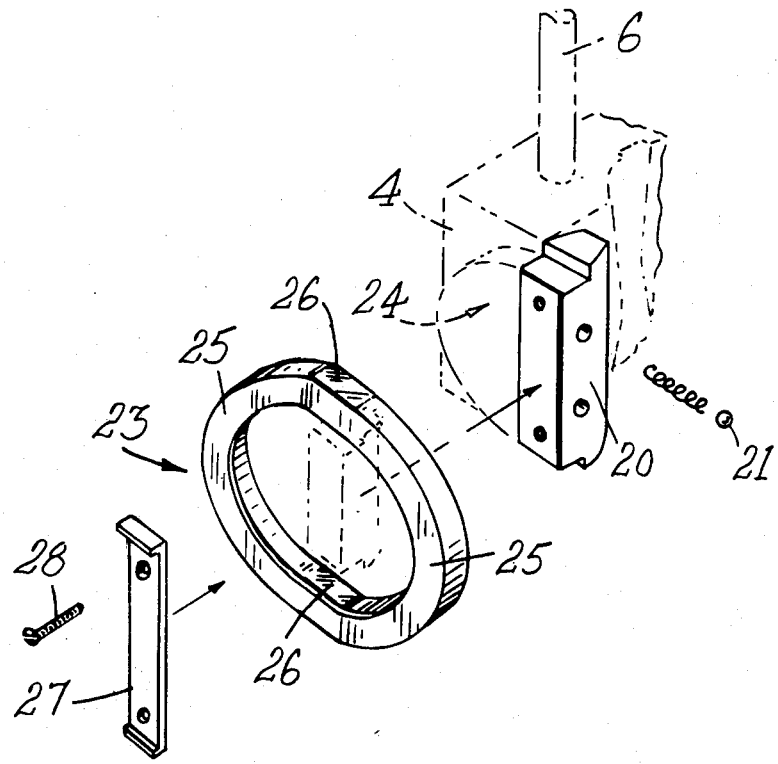
FIG. 6 is an exploded perspective view of the means for connecting the die segments together.

As shown more particularly in FIGS. 3, 4 and 5, the die segments 4 are adapted to be assembled to the rod 1 in spaced relationship to one another. This relationship is maintained while the die segments are not under load by means of spacer bars 20 which are inserted between the two halves of the composite die. The bars 20 are bored to house spring-loaded ball clips 21 which engage with corresponding recesses 22 in the opposed faces of the die segments 4.

The two die segments 4 are held together when assembled around the rod 1 by ring members 23 which are engaged over flanges 24 on the ends of the die segments 4. It will be noted that the ring members 23 have circular portions 25 and a central portion 26 which is defined by the tangent to the circles. The spacer bars 20 are located in this central portion 26 and are held in position by locking bars 27 and screws 28 so that the spacer bar and ring can be manipulated and snapped into position as a single unit.

Mention has been made earlier of the fact that the die segments 4 are capable of limited rotational movement relative to the piston rods 6. This movement is not prevented by the ring members 23 because the circular formations of the latter engage with the correspondingly shaped flanges 24 on the die segments.

The bore of the composite die is formed with four axially disposed inwardly extending ribs 29 and the diameter measured between opposed pairs of ribs is less than the external diameter of the sleeve 4. In the circumferential zones between adjacent ribs the die has axially disposed recesses 30. The distance between the opposed recesses is greater than the external diameter of the sleeve 4. When a die as described above is used, the sleeve will be caused to adhere firmly to the rod ends in the longitudinal zones defined by the ribs 29. At the same time, surplus material from the sleeve is displaced into the recesses 30. In the result, an initially cylindrical sleeve will, after the die has passed over it, have a substantially square cross-section with rounded corners.

When the die is under load, the segments 4 are forced slightly outwards relative to one another until further outward movement is arrested by the ring members 23.

The die is drawn over the sleeve 3 by admitting pressure fluid into the cylinders 9 and the ribbed configuration of the rods 1 & 2 housed within the sleeve sets up an oscillating rotational movement of the die segments 4 relative to one another as the die moves over the sleeve and compresses it onto the rods.

Within the restrictions imposed by practical considerations of weight and size, the apparatus is not capable of forcing the sleeve down into intimate contact with the rods over the entire length of the compression plane since if it were required to do so, the force applied would be unnecessarily large and would have to be sufficient to cause the sleeve material to flow i.e. extrude.

What actually happens is illustrated in FIG. 9. The sleeve is only forced into firm contact with the rods in the zones of the ribs 31 on the rods. In the intermediate zones, the inner peripheral wall of the sleeve is out of contact with the rods. In the result, the peripheral surfaces of the sleeve in the zones of the die ribs 29 is corrugated as shown in FIG. 9.

In FIG. 9:

$d_s$ is the inner diameter of the deformed sleeve and it varies from $d_s$(min.) to $d_s$(max.)

$d_b$ is the diameter of the rod core i.e. excluding the ribs 31 and it will vary from $d_b$(max.) to $d_b$(min.) with any given rod in accordance with manufacturing tolerances.

$h$ is the height of the ribs 31.

$D_1$ is the outer diameter of the deformed sleeve in a zone which does not include a rib.

$D_2$ is the outer diameter of the deformed sleeve in a zone which does include a rib.

The desired joint is effected by a combination of:

a. The folding away of surplus sleeve material by the die design. This is achieved by having four die compression planes corresponding to the die ribs 29 and the relieved or non-contact area of the die in the circumferential zones between the ribs 29.

b. Having a correct relationship between $d_s$ and $d_b$. This relationship is calculated from the $d_b$(max), h relationship and varies from $d_s = d_b$(max) to $d_s = d_b$(max) $+ a$ where $a$ is a variable and is empirically established after consideration of $d_b$(max) $+ 2h$, the yield stress of rod and sleeve, and the hoop strength of the sleeve cross-section.

c. Having a controlled link between the die segments to accommodate the difference between $D_1$ and $D_2$. This is brought about by the ring members 23 which are designed to withstand the ultimate bursting forces of the die and which operate within the 'elastic' characteristic of the material using the material elasticity to accommodate the difference between $D_1$ and $D_2$, in conjunction with limited die rotation which is controlled by the spacer bars 20 which are also used to position the ring members 23 when the die is not stressed.

It has been found highly advantageous to cause the sleeve to grip the rod ends only in a plurality of longitudinal zones which are circumferentially spaced from one another. Among the advantages flowing from this method of operation the following are of special significance:

i The joint is of adequate mechanical strength. Tests to destruction have shown that, provided the sleeve is suitably dimensioned, the rods will break outside the zone of the sleeve while the joint itself remains intact. In other words, the rods will not pull out of the sleeve.

ii Less thrust is required to force the die over the sleeve.

iii There is a lower bursting force imposed on the die.

iv There is a smaller elongation of the sleeve.

v Less metal is required for the sleeve than would be required to obtain the same cross-sectional area after deformation if the sleeve were caused to grip the rods over their entire circumference.

vi There is probably less wear on the die.

What I claim and desire to secure by Letters Patent is:

1. Apparatus for fastening to adjacent substantially co-axially disposed reinforcng rod ends a sleeve of uniform external cross-section throughout its length and having internal cross-sectional dimensions to enable it to receive and embrace both rod ends, comprising at least two fluid pressure operated jack units each having a cylinder, a piston and a piston rod; latching means for releasably securing the jack cylinders together in parallel spaced relationship to one another around one of the reinforcing rods in a zone not occupied by the sleeve; at least two die segments, which collectively provide an axial bore at least part of which is dimensionally smaller in cross-section than the external cross-sectional dimension of the sleeve, loosely mounted on the free ends of the piston rods so as to be capable of limited rotational movement relative thereto in a longitudinal direction; die segment retaining means at the extremities of the piston rods; pusher means associated with the jack cylinders extending in a direction towards the die segments which engage one end of the sleeve and prevent it from moving axially relative to the rods; ring-shaped locking members for temporarily securing the die segments in operative relationship one to the other and which permit the aforesaid limited rotational movement thereof; and complementary formations on the die segments for receiving the ring-shaped locking members.

2. Apparatus for fastening to adjacent substantially co-axially disposed reinforcing rod ends a sleeve of uniform external cross-section throughout its length and having internal cross-sectional dimensions to enable it to receive and embrace both rod ends, comprising at least two fluid pressure operated jack units each having a cylinder, a piston and a piston rod; mounting plates to which the jack cylinders are attached and through which the piston rods pass; latching means for releasably securing the jack cylinders with their mounting plates together in parallel relationship around one of the reinforcing rods in a zone not occupied by the sleeve; die segments corresponding in number to the number of mounting plates, which collectively provide an axial bore at least part of which is dimensionally smaller in cross-section than the external cross-sectional dimension of the sleeve, loosely mounted on the free ends of the piston rods so as to be capable of limited roational movement relative thereto in a longitudinal direction; die segment retaining means at the extremities of the piston rods; pusher means on the mounting plates extending in a direction towards the die segments which engage one end of the sleeve and prevent it from moving axially relative to the rods; ring-shaped locking members for securing the die segments in operative relationship one to the other and which permit the aforesaid limited rotational movement thereof; and complementary formations on the die segments for receiving the ring-shaped locking members.

3. The apparatus of claim 1, including spacer elements associated with the ring-shaped locking members which are interposed between the die segments when the said locking members are engaged.

4. The apparatus of claim 1, in which the bore collectively provided by the die segments has symmetrically arranged axially disposed inwardly projecting ribs and, in the circumferential zones between the ribs, axially disposed recesses so that the sleeve is deformed by the die segments to engage the rod ends only along longitudinally extending circumferentially spaced zones corresponding to the projecting ribs of the die segments.

5. The apparatus of claim 2 in which the pusher means comprises spigot-members.

6. The apparatus of claim 2 in which the pusher means comprises spigot members which are of such external dimensions that they can pass into the bore of the die and so ensure that the sleeve is deformed throughout its entire length.

7. The apparatus of claim 2, including four fluid pressure operated jack units, two mounting plates each of which has two jack cylinders attached to it, and two complementary die segments.

* * * * *